Dec. 15, 1959   E. A. FERRIS ET AL   2,917,145
ONE-WAY CLUTCH
Filed Dec. 17, 1954
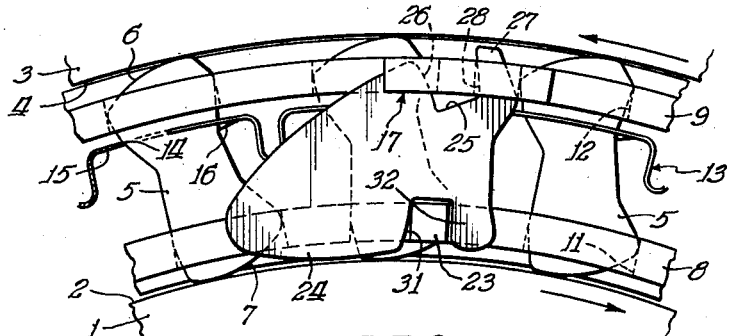
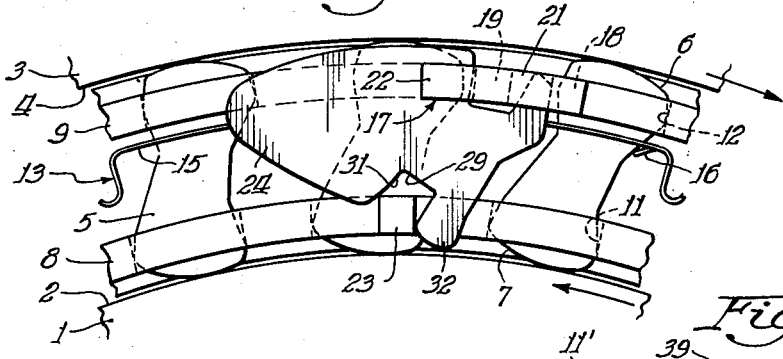
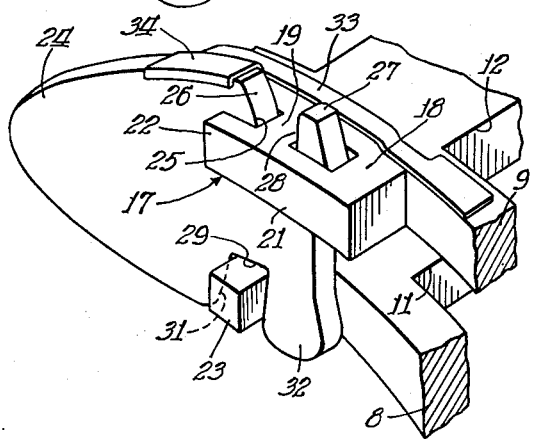
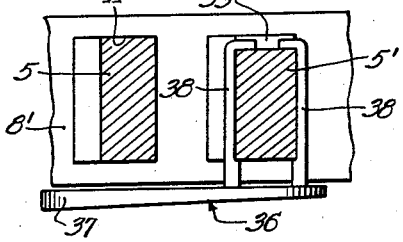
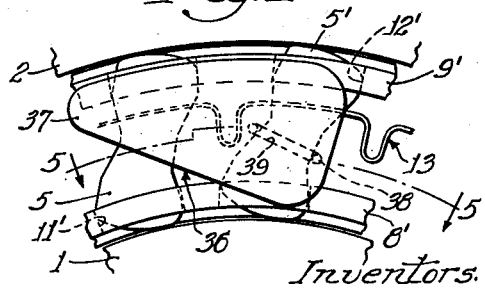
Inventors.
Ernest A. Ferris and
Bertram A. Fulton
By Donald W. Banner Atty.

United States Patent Office 2,917,145
Patented Dec. 15, 1959

2,917,145

ONE-WAY CLUTCH

Ernest A. Ferris, Elmhurst, and Bertram A. Fulton, Glen Ellyn, Ill., assignors to Borg-Warner Corporation, Chicago, Ill., a corporation of Illinois Application December 17, 1954, Serial No. 476,032

4 Claims. (Cl. 192—45.1)

This invention relates to one-way engaging devices, and more particularly to one-way engaging devices incorporating sprags or grippers disposed between a pair of races, the grippers being spaced apart and controlled by a pair of radially spaced and relatively movable cages, means being provided either to disengage the sprags completely from one of the races under certain conditions or to hold the sprags in engagement with the races under said conditions.

In certain installations substantial wear is experienced in sprag clutches during their overrunning conditions at excessive speed in which the freewheel drag of the sprags against one of the races results in abnormal and undesirable wear of the sprags and the race surfaces. It is, therefore, desirable to lift the sprags from engagement with one of the races during these high speed overrunning conditions to eliminate this wear.

In order to accomplish this purpose, it has been found to be particularly desirable to employ a sprag clutch incorporating a plurality of sprags which extend through suitable openings in a pair of radially spaced and relatively rotatable cages, the openings closely receiving the sprags, one or more centrifugally responsive weights being positioned axially of the cages to effect relative rotation therebetween upon the attainment of undesirable high speed conditions, whereupon the cages—by such relative movement—effect lifting of the sprags from one of the race surfaces.

It is, therefore, one object of the present invention to provide an improved one-way engaging device incorporating sprags and a pair of radially spaced and relatively rotatable cages having openings receiving the sprags, in which means are provided to effect relative rotation of the cages in a predetermined direction in response to the speed of rotation of the unit to move the sprags away from one of the races, or to hold the sprags in engagement therewith.

Another object of the present invention is to provide a device in accordance with the preceding object in which one or more weights are suitably positioned axially of the cages, the weights being so constructed and arranged as to effect relative rotation between the cages upon the attainment of high speeds in the unit whereby the sprags are lifted from one of the races.

Another object of the present invention is the provision of a device in accordance with the preceding objects in which elongated, centrifugally responsive weight means are mounted between suitable camming surfaces on the inner and outer cages, and in which spring means are provided to bias the centrifugally responsive weights against movement in a direction to effect lifting of the sprags from the races.

Another object of the present invention is an improved one-way engaging device incorporating sprags which extend through and are closely received by suitable openings in a pair of relatively rotatable and radially spaced cages, in which weight means are mounted laterally of the cages and by suitable means attached to certain of the sprags whereby movement of the weight means in response to centrifugal force effects movement of the sprags attached thereto and consequent movement of the cages so that all of the sprags are lifted free of one of the race surfaces.

Other objects and features of the present invention will be readily apparent to those skilled in the art in the specification and appended drawings illustrating certain preferred embodiments in which:

Figure 1 is a partial view in side elevation of a one-way engaging device incorporating the principles of the present invention;

Figure 2 is a view similar to Figure 1 showing the parts in a moved position;

Figure 3 is a perspective view of the portions of the structure illustrated in Figures 1 and 2;

Figure 4 is a partial view in side elevation of a modification of the present invention;

Figure 5 is a section view along the plane of line V—V of Figure 4.

Referring now to the form of the present invention illustrated particularly in Figures 1 through 3, there is illustrated therein a one-way engaging device comprising an inner race 1 having an annular surface 2 to be engaged by the sprags, and an outer race 2 having an annular surface 4 to be engaged by the sprags, surfaces 3 and 4 together defining a circumferential opening. Disposed between the annular surfaces 2 and 4 are a plurality of longitudinally spaced sprags 5 each of which is provided with radially spaced, race-engaging surfaces 6 and 7, which are curved about spaced centers so that attempted relative rotation of the races in the direction of the arrows in Figure 1 effects movement of the sprags to the position illustrated therein and thereby effects a wedging engagement of the sprags 5 between the races 1 and 3 which are thereby connected together for unitary rotation. Rotation of the sprags to the disengaged position, illustrated in Figure 2, by virtue of relative race rotation in the direction indicated by the arrows in that figure results in the sprags permitting free relative rotation of the races in that direction.

Means are provided for spacing and effecting substantially common angular movement of the sprags 5 which comprise an inner annular cage 8 and an outer annular cage 9. The inner cage 8 is provided with a plurality of circumferentially spaced openings 11 through which the sprags 5 extend to engage the inner race 1. The outer cage 9 is provided with a plurality of circumferentially spaced openings 12 through which the outer ends of the sprags 5 extend to engage the outer race 3. The dimensions of the sprags 5, and the dimensions of openings 11 and 12, are such that movement of the sprags 5 from the engaged position of Figure 1 to the disengaged position of Figure 2, and vice versa, results in relative rotation of the cages 8 and 9. These dimensions are also such that the sprags 5 are, throughout this range of tilting movement, substantially always in contact with the sides of the openings 11 and 12 through which they extend, with only a bearing clearance between the sprags and the sides of the cooperating openings existing. This results in substantially common angular movement of each and every one of the sprags throughout the operating range of the device.

In order to bias the sprags toward the position in which they wedgingly engage the races 1 and 3, there is also provided an energizing spring 13 of annular form, preferably fabricated of a suitable resilient sheet metal material. The spring 13 is provided with a plurality of openings 14 therethrough, through which the sprags 5 extend. Each of the openings 14 is formed in part by substantially straight, axially extending sides 15, and opposed thereto is a resilient tab 16, integral with the spring 13, which engages the associated sprag to bias it into engaging position with the opposed side 15 and toward engaging position with the races.

The particular one-way engaging device heretofore described is more completely described and claimed in the copending application of Harry P. Troendly et al., Serial No. 379,534, filed September 11, 1953, and entitled "One-Way Clutch," now Patent No. 2,824,636.

The outer cage 9 is provided with a plurality of camming extensions 17 integral therewith and projecting axially from the cage 9, the extensions 17 being spaced circumferentially in symmetrical relationship upon the cage 9. Each extension 17 comprises arms 18 and 19 projecting perpendicularly in an outward direction from the cage 9, and an arm 21 connecting the arms 18 and 19 extending generally parallel to the sides of cage 9. The arm 21 has the portion 22 which extends beyond the arm 19 as may be seen clearly in Figure 3.

The cage 8 is provided with a plurality of lugs 23, extending perpendicularly therefrom in an axial direction, and disposed about the cage 8 in symmetrical circumferential relationship so as to correspond to the extensions 17 on the cage 9.

Mounted upon the sides of the cages 8 and 9, respectively, in association with a lug 23 and an extension 17, are a plurality of centrifugally responsive weights 24. Each of the weights 24 has its center of gravity so disposed that it tends to move from the position illustrated in Figure 1 toward the position illustrated in Figure 2 in response to the centrifugal force resulting from rotation of the device during overrunning. Each of the weights 24 is constructed so as to have an upper opening 25 therein defined by a surface 26 and an integral leg 27. As best illustrated in Figure 3, the legs 27 of each of the weights 24 extend between arms 18 and 19 of the cooperating extension 17 on the cage 9, while the portion 22 of the arm 21 extends parallel to and outwardly of the outer surface of the weight 24 to maintain it in position. Each of the arms 27 is provided with a cam surface 28 constructed and arranged to engage the arm 18 of the extension 17 in response to movement of the weight 24 under the action of the centrifugal force as will be more fully described hereinafter. Each of the weights is also provided with a lower opening or notch 29 therethrough which is defined by a surface 31 and a leg 32 integral with the weight 24. The opening 29 is adapted to receive lug 23 extending from the cages 8.

The operation of the device will now be explained. When attempted relative rotation between the races 1 and 3 occurs which is in the direction indicated by the arrows in Figure 1, sprags 5 move to wedgingly connect the races 1 and 3 so that they will rotate together in unison. Upon rotation of the races in the relative direction illustrated in Figure 2, the sprags will move from the position shown in Figure 1 to that in Figure 2. This is freewheeling or overrunning condition of the device. When the outer race rotates very rapidly, for example, in this freewheeling condition, the centrifugal force operating upon the weights 24 will effect their rotation in a generally clockwise direction, as viewed in Figure 2. Under these conditions, the cam surface 28 on the arm 27 of the weight 24 engages the arm 18 of extension 17 on the outer cage 9 so as to tend to rotate the cage 9 in a clockwise direction as viewed in Figures 1 and 2. Simultaneously, the inner surface of the leg 32 on the weight 24 engages the associated lug 23 on the inner cage 8 so as to tend to move that cage counterclockwise as viewed in Figures 1 through 3. As a result of this relative movement of the cages, the sprags 5 which, as previously indicated, are closely received in the openings 11 and 12 of the cages 8 and 9, respectively, are rotated against the bias of spring 13 in a generally clockwise direction—as viewed in Figures 1 and 2—so as to be lifted free from engagement with the inner race 2. Under such conditions, the wear on the sprags 5 and inner race 1 usually experienced in high speed overrunning conditions is eliminated. Upon reduction of the speed of the outer race, the centrifugal force operative upon the weights 24 is reduced. The tabs 16 on the spring 13, constantly in engagement with sprags 5, will effect movement of the sprags back into engagement with the race 1, which will move the outer cage 9 in a counterclockwise direction as viewed in Figure 2 and the inner cage 8 clockwise as viewed in that figure. As a result, the weights 24 will be rotated by virtue of the lugs 23 and the arms 18 and 19 in a counterclockwise direction and the sprags will once again engage both the races so as to be instantly ready to wedgingly engage therebetween when the relative direction of rotation between the races is that indicated by the arrows in Figure 1.

If desired, a leaf spring 33 may be provided on the cage 9 in association with each of the weights 24. Such a leaf spring may be mounted to the cage by any suitable means (not shown), the spring 33 provided with an integral arm portion 34 overlying the radially outwardly facing surface of the weight 24. Upon movement of the weights 24 in response to centrifugal force as aforementioned, both the springs 33 and 13 operate against this movement. It will be obvious that the springs 13 and 33 will also, under such circumstances, tend to return the weights 24 to their normal position when the centrifugal force is no longer operative.

Turning now to the modification of the present invention illustrated in Figures 4 and 5, there is disclosed therein a plurality of sprags 5 and 5' disposed in circumferentially spaced relation between races 1 and 2, as previously described. The sprags 5 and 5' extend through openings 11' and 12' in the cages 8' and 9', respectively (which are exactly the same as cages 8 and 9 in Figures 1 through 3 except that the cages 8' have no lugs 23 and the cages 9' have no extensions 17, nor are any springs 33 provided). A resilient cage 13, as previously described, is also provided which biases the sprags constantly toward engagement with the races. Sprags 5' are exactly the same as sprags 5 with the exception that each of the sprags 5' is provided with a notch along one axially facing side thereof, as explained subsequently more fully.

The number of sprags 5' employed may be varied, but preferably at least two of such sprags 5' are utilized. As shown in Figures 4 and 5, these sprags 5' are assembled in the cages 8' and 9' and extending through the openings therein in circumferential alignment with the sprags 5. Preferably, the sprags 5' are spaced symmetrically one from the other circumferentially. Associated with each of the sprags 5' is a centrifugally responsive weight assembly 36 which comprises a tapered weight portion 37 spaced axially from the sprags and exteriorly of the cages 8' and 9' as shown in Figure 5. Each of the weight assemblies 36 comprises a pair of somewhat resilient arms 38 integral with the weights 37 which extend inwardly between the cages and embrace one of the sprags 5'. The ends of the arms spaced from the weights 37 are bent inwardly toward each other, as shown in Figure 5, and are closely received in a slot or notch 39 provided in the flat axially facing side of the sprag 5' which is spaced from the weight 37. It will, therefore, be obvious that the sprags 5' support the weight assemblies 36.

When the clutch illustrated in Figures 4 and 5 is in its overrunning condition and the outer race moves at substantially high speeds, the centrifugal force operating upon the weight 37 will cause the enlarged portion thereof to move toward the outer cage 9' (that is to say, the weight 37 will move in a clockwise direction from the view of Figure 4). This movement of the weight 37 will effect comparable rotational movement of the arms 38. Inasmuch as the slot or notch 39 in the sprags 5' closely receives the inturned ends of the arms 38, and furthermore in view of the fact that the arms 38 embrace the sprags 5' enclosed thereby rather tightly, the sprag 5' will also be rotated in a clockwise direction from the view of Figure 4. This will, in view of the fact that the sprag 5' and the sprags 5 fit closely within the windows 11' and 12' of the cages 8' and 9', respectively, with only a working clearance therebetween—effect movement of the cage 8' in a counterclockwise direction from the view of Figure 4, and move cage 9' in a clockwise direction. This relative movement of the cages effects rotation of all of the sprags in a clockwise direction, the cages being moved sufficiently so that the sprags 5 and 5' are moved against the bias of spring 13 free from engagement with the inner race 1. As a result, during this high speed overrunning condition, the sprags 5 and 5' do not rub against the inner race 1 and consequently, the undesirable wear on that race and on the sprags is eliminated. When the speed of the outer race decreases so that the centrifugal effect of the weights 37 reduces sufficiently, the sprags 5 and 5' will be returned into engagement with the races by virtue of the bias applied thereto by the spring 13.

It should be noted that the number and position of weight assemblies 36 may be varied to change the centrifugal effect thereof upon the device. It should also be noted that with a clutch provided with a plurality of sprags 5', weight assemblies 36 may be added or changed in position as desired to achieve whatever centrifugal effect is desirable under any particular condition. Inasmuch as the arms 38 of the weight assemblies 36 are somewhat resilient, the assemblies 36 are added to the weights 5' after all of the sprags are assembled in the cages, and both the insertion and removal of the weight assemblies 36 from the clutch is very readily accomplished.

It will, therefore, be seen that the present invention provides one-way engaging devices of the sprag type in which weight means are provided adjacent the pair of radially spaced cages, the weight means effecting movement of the cages relative to each other in a direction to cause disengagement of the sprags from one of the races upon the occurrence of high speed overrunning condition. Inasmuch as all the sprags substantially fill the openings in the radially spaced cages, movement of one of the cages is operative to effect movement of all of the sprags employed so that the lifting of all of the sprags from the races is both readily and surely accomplished.

It will be readily apparent to those skilled in the art that the weight assembly 36 may, if desired, be positioned such that the heavier portion of the weight 37 (shown to the left in Figures 4 and 5) could extend toward the right from the view of Figures 4 and 5. In such case, the spring 13 and the weight assemblies 36 would act together in response to centrifugal force to tend to maintain the sprags 5' in engagement with the races. Such an arrangement has been found to be particularly useful where substantially all back lash is to be eliminated, the sprags being maintained in engagement with the races during almost all overrunning conditions and ready to wedgingly engage between the races.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a one-way engaging device adapted for use between a pair of races, an inner cage, an outer cage, means defining a plurality of circumferentially spaced openings in said cages, a plurality of sprags respectively extending through an opening in said inner cage and through an opening in said outer cage, means defining race engaging surfaces on said sprags constructed and arranged to effect wedging engagement between said sprags and races upon relative rotation therebetween in one direction whereby said races rotate together in unison and to permit relative rotation therebetween in the opposite direction, means biasing said sprags toward engagement with said races, and means constructed and arranged to disconnect said sprags from one of said races during predetermined overrunning conditions of said device comprising centrifugally responsive weight means mounted adjacent said cages and carried by certain of said sprags, said centrifugally responsive weight means including axially extending arms in engagement with certain of said sprags.

2. In a one-way engaging device adapted for use between a pair of races, an inner cage, an outer cage, means defining a plurality of circumferentially spaced openings in said cages, a plurality of sprags respectively extending through an opening in said inner cage and through an opening in said outer cage, means defining race engaging surfaces on said sprags constructed and arranged to effect wedging engagement between said sprags and races upon relative rotation therebetween in one direction whereby said races rotate together in unison and to permit relative rotation therebetween in the opposite direction, means biasing said sprags toward engagement with said races, means constructed and arranged to disconnect said sprags from one of said races during predetermined overrunning conditions of said device comprising centrifugally responsive weight means mounted adjacent said cages and carried by certain of said sprags, said centrifugally responsive weight means including axially extending arms in engagement with certain of said sprags, and spring means to bias said sprags against movement resulting from centrifugal force on said weight means.

3. In a one-way engaging device adapted for use between a pair of races, an inner cage, an outer cage, means defining a plurality of circumferentially spaced openings in said cages, a plurality of sprags respectively extending through an opening in said inner cage and through an opening in said outer cage, means defining race engaging surfaces on said sprags constructed and arranged to effect wedging engagement between said sprags and races upon relative rotation therebetween in one direction whereby said races rotate together in unison and to permit relative rotation therebetween in the opposite direction, means biasing said sprags toward engagement with said races, means constructed and arranged to disconnect said sprags from one of said races during predetermined overrunning conditions of said device comprising centrifugally responsive weight means mounted adjacent said cages and carried by certain of said sprags, said centrifugally responsive weight means including axially extending arms in engagement with certain of said sprags, certain of said sprags being provided with slots adapted to closely receive portions of said arms, and spring means to bias said sprags against movement resulting from centrifugal force on said weight means.

4. In a one-way engaging device adapted for use between a pair of races, an inner cage, an outer cage relatively movable rotatably with respect to said inner cage, means defining a plurality of circumferentially spaced openings in said cages, a plurality of sprags respectively extending through an opening in said inner cage and an opening in said outer cage, means defining race-engaging surfaces on said sprags constructed and arranged to wedgingly engage said sprags between said races upon relative rotation therebetween in one direction whereby said races rotate together in unison and to permit relative rotation therebetween in the opposite direction, means biasing said sprags toward engagement with said races, and means constructed and arranged to force said sprags to assume a desired relationship with respect to said races in response to predetermined overrunning conditions of said device comprising centrifugally responsive means axially spaced from and adjacent one side of both of said cages, said sprags being constructed and arranged to circumferentially fill said cage openings with only a bearing clearance therebetween, said centrifugally responsive means comprising elongated weight means adjacent said cages and constructed and arranged to tend to maintain said sprags in engagement with said races upon the occurrence of said predetermined conditions, said elongated weight means being mounted to and carried by certain of said sprags.

References Cited in the file of this patent

UNITED STATES PATENTS

| | | |
|---|---|---|
| 2,173,604 | Dodge | Sept. 19, 1939 |
| 2,385,799 | Dodge | Oct. 2, 1945 |
| 2,683,509 | Jandasek | July 13, 1954 |

FOREIGN PATENTS

| | | |
|---|---|---|
| 1,095,050 | France | Dec. 15, 1954 |